United States Patent
Lettau

(10) Patent No.: US 7,681,139 B1
(45) Date of Patent: Mar. 16, 2010

(54) CONFIGURATOR INCLUDING AUTOMATIC RECEIPTS

(75) Inventor: Tyler J. Lettau, Hercules, CA (US)

(73) Assignee: Adobe Systems, Incorporated, San Jose, CA (US)

( * ) Notice: Subject to any disclaimer, the term of this patent is extended or adjusted under 35 U.S.C. 154(b) by 450 days.

(21) Appl. No.: 11/521,989

(22) Filed: Sep. 15, 2006

(51) Int. Cl.
*G06F 15/00* (2006.01)
*G06F 13/00* (2006.01)

(52) U.S. Cl. .................................. 715/765; 715/851

(58) Field of Classification Search ......... 715/851–855, 715/763–765, 740–745, 803–805, 762
See application file for complete search history.

(56) References Cited

U.S. PATENT DOCUMENTS

| | | | |
|---|---|---|---|
| 6,043,816 A | 3/2000 | Williams et al. | |
| 6,108,004 A * | 8/2000 | Medl | 715/804 |
| 6,333,752 B1 | 12/2001 | Hasegawa et al. | |
| 6,789,251 B1 | 9/2004 | Johnson | |
| 6,859,212 B2 * | 2/2005 | Kumar et al. | 715/744 |
| 6,957,395 B1 | 10/2005 | Jobs et al. | |
| 2002/0093535 A1 | 7/2002 | Murphy | |
| 2003/0218633 A1 | 11/2003 | Mikhail et al. | |
| 2009/0043689 A1 * | 2/2009 | Yang et al. | 705/38 |

OTHER PUBLICATIONS www.wireless.att.com/cell-phone-service; and http://web.archive.org/web/20040403320021 5/www.cingular.com/index Apr. 2005.*

* cited by examiner

*Primary Examiner*—Cao "Kevin" Nguyen
(74) *Attorney, Agent, or Firm*—Robert C. Kowert; Meyertons, Hood, Kivlin, Kowert & Goetzel, P.C.

(57) ABSTRACT

A configurator including automatic receipts is described, including presenting a first pod and a second pod, the first pod comprising a first input area to receive a first input, receiving the first input into the first pod, summarizing a first result of the first input into a first receipt, and displaying the first receipt in the second pod.

25 Claims, 11 Drawing Sheets

CONFIGURATOR INCLUDING AUTOMATIC RECEIPTS

FIELD OF THE INVENTION

The present invention relates generally to software. More specifically, a configurator including automatic receipts is described.

BACKGROUND OF THE INVENTION

Various techniques may be used to collect information from a user. For example, a user visiting a website using a web browser may be prompted to enter requested information into the browser. A website may request information such as selections of products or services that a user is interested in purchasing or personal information about the user. The browser may present one or more fields or other input areas (e.g., menus, checkboxes or radio buttons) to the user. The user may then input the requested information into the browser using an input device such as a mouse or a keyboard.

The requested information may be collected using a single hypertext page or multiple pages. When using multiple pages, in order to continue to a subsequent page, the page is retrieved from a local or remote source, and the new page is loaded into the browser. Loading the new page may be slow and may lack sufficient interactivity. Information collected from the previous page may be transmitted to a remote or local source after a user indicates that he has finished (e.g., by clicking a button).

Thus, collection of information from a user without the limitations of conventional techniques is desired.

BRIEF DESCRIPTION OF THE DRAWINGS

Various examples are disclosed in the following detailed description and the accompanying drawings.

DETAILED DESCRIPTION

Figure 1A:
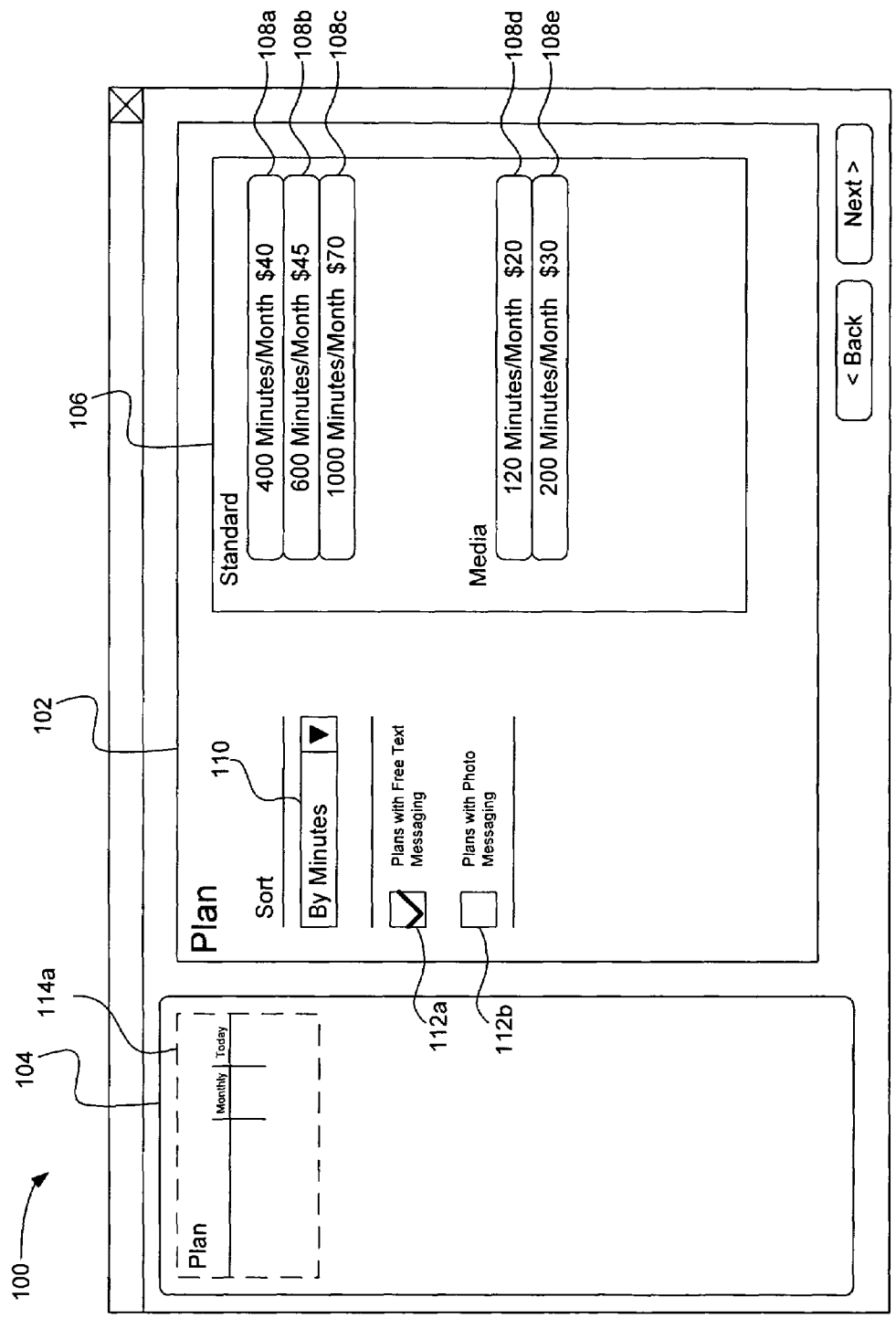
FIGS. 1A-1G illustrate a multi-operation configurator using a first pod to receive input and a second pod to display a receipt summarizing the input or results of the input according to an example.

Various examples of the invention may be implemented in numerous ways, including as a system, a process, an apparatus, or a series of program instructions on a computer readable medium such as a computer readable storage medium or a computer network where the program instructions are sent over optical or electronic communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields related to the examples has not been described in detail to avoid unnecessarily obscuring the description.

According to some examples, a configurator that generates receipts of the results of various operations is described. An operation may be any event during which a user or other source may provide input or other data. Multiple operations may be related and presented using a configurator. A receipt may be a display showing summarized results of an input to an operation, or may more generically be a data structure or other container in which those summarized results are stored. A configurator may be a program or other process that collects information from a user and may include multiple operations. The configurator may include an input pod to receive input from a user, and a receipt pod to display receipts including summaries of the results of received input. A pod may be, according to an embodiment, a graphical or visual container for displaying visual and textual data relating to one or more operations. For example, a pod may be a graphical window or a pane or a frame within a window or a web page. According to other examples, a pod may be a data structure related to one or more operations that stores data used to perform those operations. An input pod may be, for example, a pod that receives input from a user or other source. A receipt pod may be used to display receipts, which include summarized results of operations. The receipt pod may include receipts of a current operation as well as none or some of the other operations. The receipt pod allows a user to view summaries of the various operations as well as to navigate between the various operations.

Multi-Operation Configurator

FIGS. 1A-1G illustrate a multi-operation configurator using a first pod to receive input and a second pod to display a receipt summarizing the input or results of the input according to an embodiment. A configurator 100 may be a program or other process that allows a user to enter information or configure settings for various different applications. The configurator 100 may, according to some examples, automatically generate receipts of operations or results of operations performed using the configurator 100. For example, a configurator 100 may be used to select a cellular telephone and a cellular service plan, to complete an income tax return, or to input personal information (e.g., to purchase health insurance or open an account). The configurator 100 may be used where one or more operations may be performed in various pods, as explained further below.

As described herein, a process may include one or more operations (i.e., may be a multi-operation process). In some embodiments, an operation may be used to collect information or data from a user. For example, an operation may include a set of items for a user to choose from, or may include fields into which a user may enter requested information. A process may include multiple operations which may be inter-related.

For example, the configurator 100 may be used to purchase a cellular telephone and establish cellular service. Using the configurator 100 to choose a cellular telephone and cellular service, a first operation may choose the service plan (e.g., 400 minutes for $40/month), a second operation may choose the cellular telephone, and a third operation may choose accessories for the telephone. Additionally, a fourth, or checkout operation, may be used to complete the transaction using the configurator. Using other processes, for example, a first operation of a income tax return process may include collecting information about a taxpayer, a second operation may include generating a 1040 form, and a third operation may include preparing miscellaneous forms.

In some examples, the configurator 100 may display various selections in a first pod to allow a user to configure a process as desired. When a selection has been made (or when a user is done with the operation), the configurator 100 may summarize the input into a receipt, and display the receipt in a second pod. A user may later select the receipt (which may be one of several receipts displayed in the second pod) to restore the operation to the first pod.

FIG. 1A illustrates the configurator 100 during a first operation according to some examples. The configurator 100 includes a first pod 102 to receive input and a second pod 104 to summarize the input or other information. Hereinafter, the first pod 102 is referred to as the input pod 102, and the second pod 104 is referred to as the receipt pod 104. A pod may be a graphical or visual container such as a window, or a pane or frame within a window or webpage, for displaying visual and textual data relating to one or more operations. The input pod 102 receives input from a user, and its appearance and functionality may change depending on the current operation of the process. For example, a cellular telephone/plan configurator process may include several operations: a first operation to choose a cellular service plan, a second operation to choose a cellular telephone, and a third operation to choose accessories for the telephone.

As shown in FIG. 1A, the configurator 100 receives input to choose a cellular service plan during the first operation. The input pod 102 includes an input area 106 into which a user may make input (e.g., selections) regarding his cellular service plan. A user may choose one of several buttons 108, each corresponding to a different cellular service plan. For example, the user may select the button 108a to choose a plan including 400 minutes every month and costing $40 every month.

The buttons 108 are divided into two groups: the buttons 108a-108c that correspond to standard cellular plans, and the buttons 108d-108e that correspond to cellular service plans including media access. The display of the plans may be sorted and filtered using a drop-down menu 110 and two checkboxes 112a and 112b. The drop-down menu 110 allows a user to choose the order in which he wants the plans in the buttons 108 to appear. For example, as shown here, the plans are sorted by minutes within each of their groups. The checkbox 112a may allow a user to show or hide plans including free text messaging, and the checkbox 112b may allow a user to show or hide plans including photo messaging. Various other filtering options may also be used. According to another example, as the selections are more finely filtered (i.e., fewer buttons 108 are shown), more detail may be displayed within the buttons 108. For example, the buttons 108 may become larger and show more detail about the selections; the button 108a may indicate that the 400 included minutes are daytime minutes, and that the plan corresponding to the button 108a includes additional weekend minutes. It is understood that the buttons 108 and other elements of the input pod 102 may be presented in any manner.

Once the user has made a selection, the result of the selection (e.g., the plan the user chosen) is summarized into a receipt 114a, which is then displayed in the receipt pod 104. A shown here, the user has not yet made a selection, so the receipt 114a corresponding to the first operation includes no information regarding a selected plan. The receipts 114 shown here include two columns: one showing recurring monthly costs (e.g., the costs of the service plan), and the other showing costs that are to be paid today (e.g., the price of the telephone). Various other configurations may also be used.

Figure 1B:
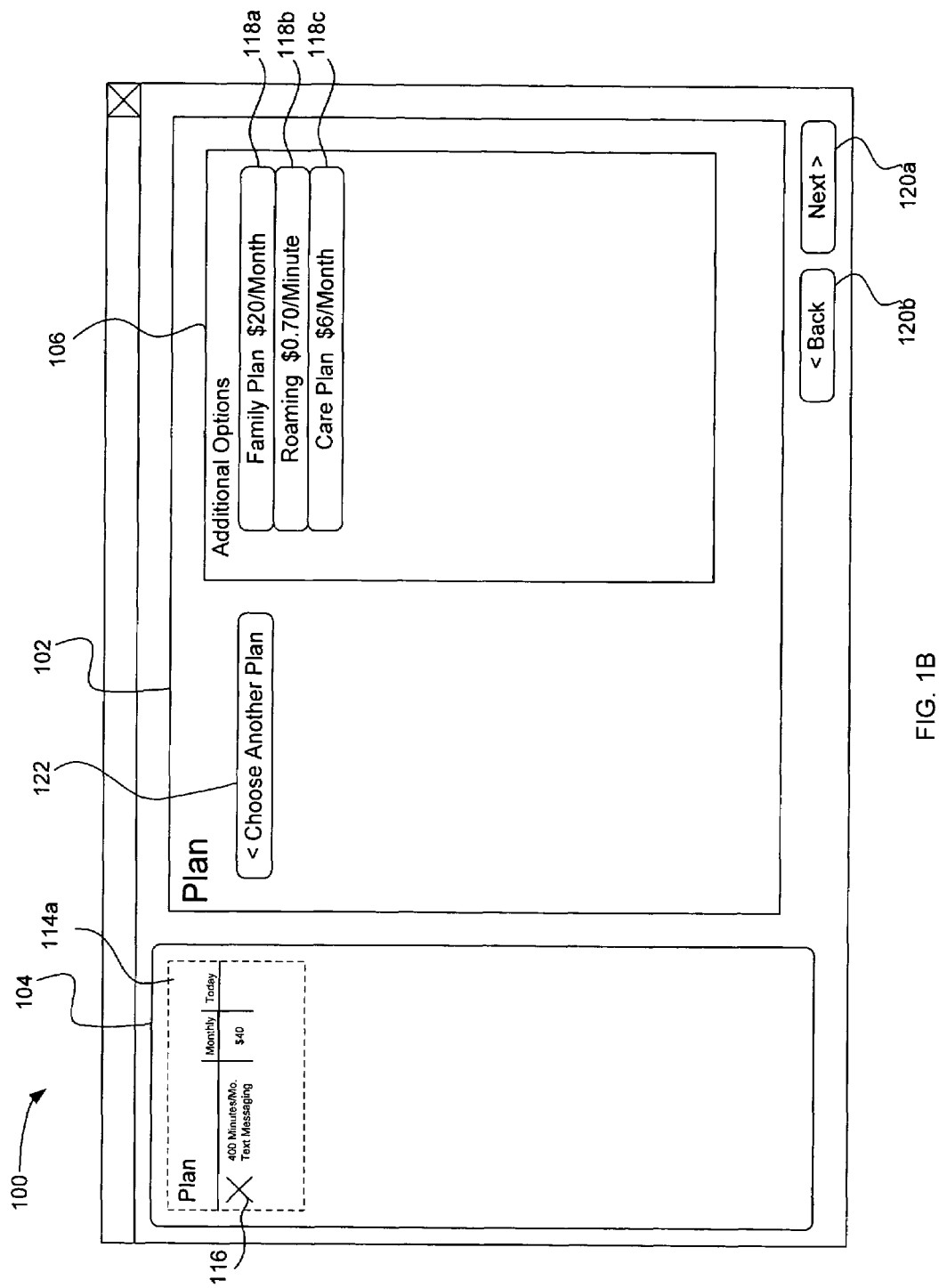

Once a user has selected a plan by selecting (e.g., by clicking) one of the buttons 108, the configurator continues to show additional options for the plan. FIG. 1B illustrates an additional options input area, according to some examples. The user is working with the first operation of the process. A service plan has been chosen and the specifics of the plan are summarized and displayed in the receipt 114a. The receipt 114a may include an icon 116 to remove a selected item from a receipt.

The input area 106 is redrawn to include options related to a service plan that the user has chosen. The additional options may be selected by selecting one of the buttons 118. For example, a user may select the button 118a to add a family plan option to his service plan. The family plan option may then be added to the receipt 114a. The user may then use one of the navigation buttons 120 to go to the next operation (using the 'next' button 120a) or to return to the beginning (using the 'back' button 120b). If the user decides to choose another plan, the user may select the button 122.

Figure 1C:
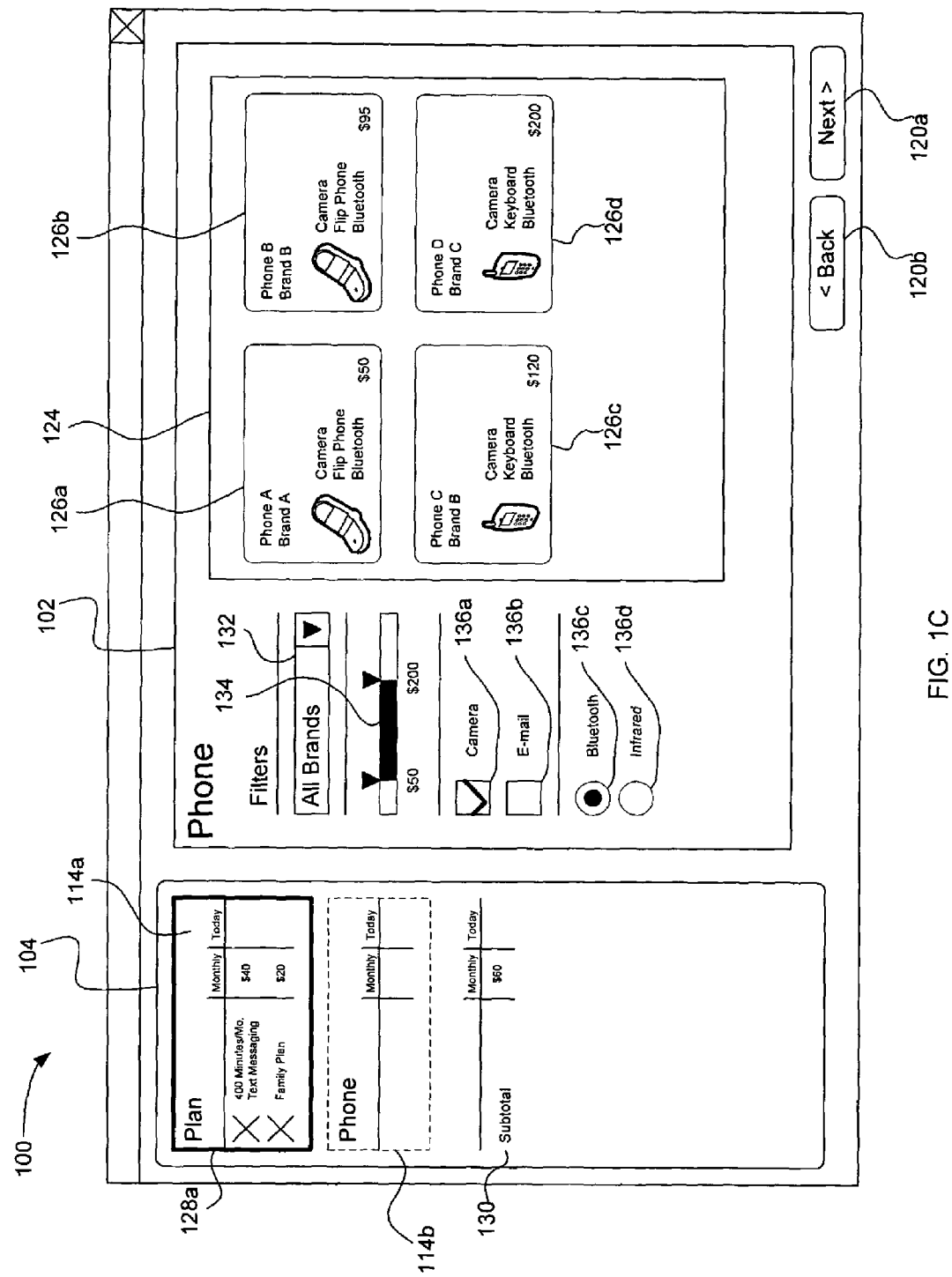

FIG. 1C illustrates the configurator 100 allowing a user to provide input during a second operation of the process according to some examples. As shown in FIG. 1C, the input pod 102 now displays an input area 124 including various buttons 126 to select a cellular telephone during the second operation. Since the first operation is completed, the first receipt 114a is completed; a complete border 128a surrounds the receipt 114a. The border 128a may identify the receipt 114a to indicate that the first operation corresponding to the receipt 114a is no longer active. The border 128a or other visual indication may be added to the receipt to provide the identification. In comparison, a receipt 114b for the second operation (the operation active as shown in FIG. 1C) has no border or a broken border to indicate that the receipt 114a is summarizing a result of an active operation. Additionally, a subtotal receipt 130 may be displayed that totals the charges of the receipts 114. The subtotal receipt 130 is an example of interactivity between the receipts 114; the receipts 114 may interact in other ways such as providing numbers of items ordered, total shipping times, or the status of a refund. Additionally, now that the first operation is complete, the receipt 114a is displayed simultaneously with the input area 124 of the second operation.

According to some examples, during the transition between the first operation and the second operation (e.g., after a user selects the next button 120a), a visual indication may link the contents of the first pod 102 (e.g., the input area 106) with the receipt 114a. For example, motion, such as animation, may be used to indicate the transition between the operations. The input area 106 may visually transfer itself to the receipt 114a, and the input area 124 for the second operation may appear after the transition.

According to other examples, a user may select (e.g., by clicking) the receipt 114a to return to the first operation. For example, if the user selects the receipt 114a, the first operation is restored and becomes active again, and the input area 106 (see FIG. 1A) is again displayed in the input pod 102. The receipt pod 104 can therefore be used to effect navigation when using the configurator 100.

Several filters may be used to help a user select a telephone. For example, a pull-down menu 132 may be used to select one or more brands to be displayed in the input area 124. A slider 134 may be used to select a range of prices to view. For example, a user may wish to see only telephones costing more than $50 and less than $200. Checkboxes 136a and 136b, and radio buttons 136c and 136d may be used to specify certain features that the user desires.

Figure 1D:
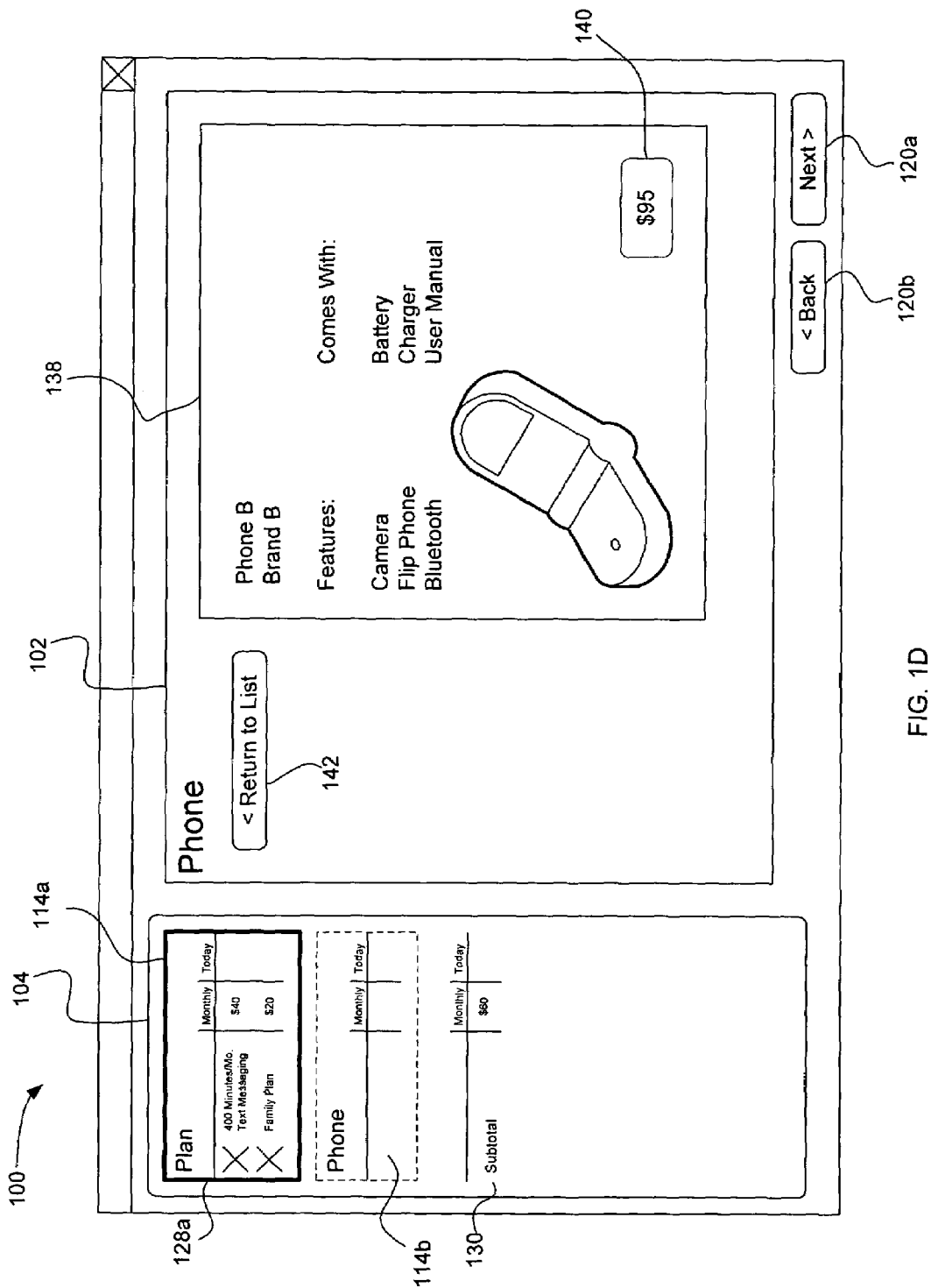

When a user selects one of the buttons 126, the input pod 102 shows a detail panel for the selected telephone. FIG. 1D illustrates a detail panel 138 for a selected telephone, according to some embodiments. The detail panel 138 may be displayed in the input area 124 after the user has selected one of the telephones represented by the buttons 126. The detail panel 138 shows more information about the selected telephone, and allows a user to add the telephone to his cart by selecting a button 140. The user may also return to the display shown in FIG. 1C by selecting a button 142. The detail panel 138 is another representation of the input area 124 that allows a user to select a telephone and obtain more detailed information about the telephone.

Figure 1E:
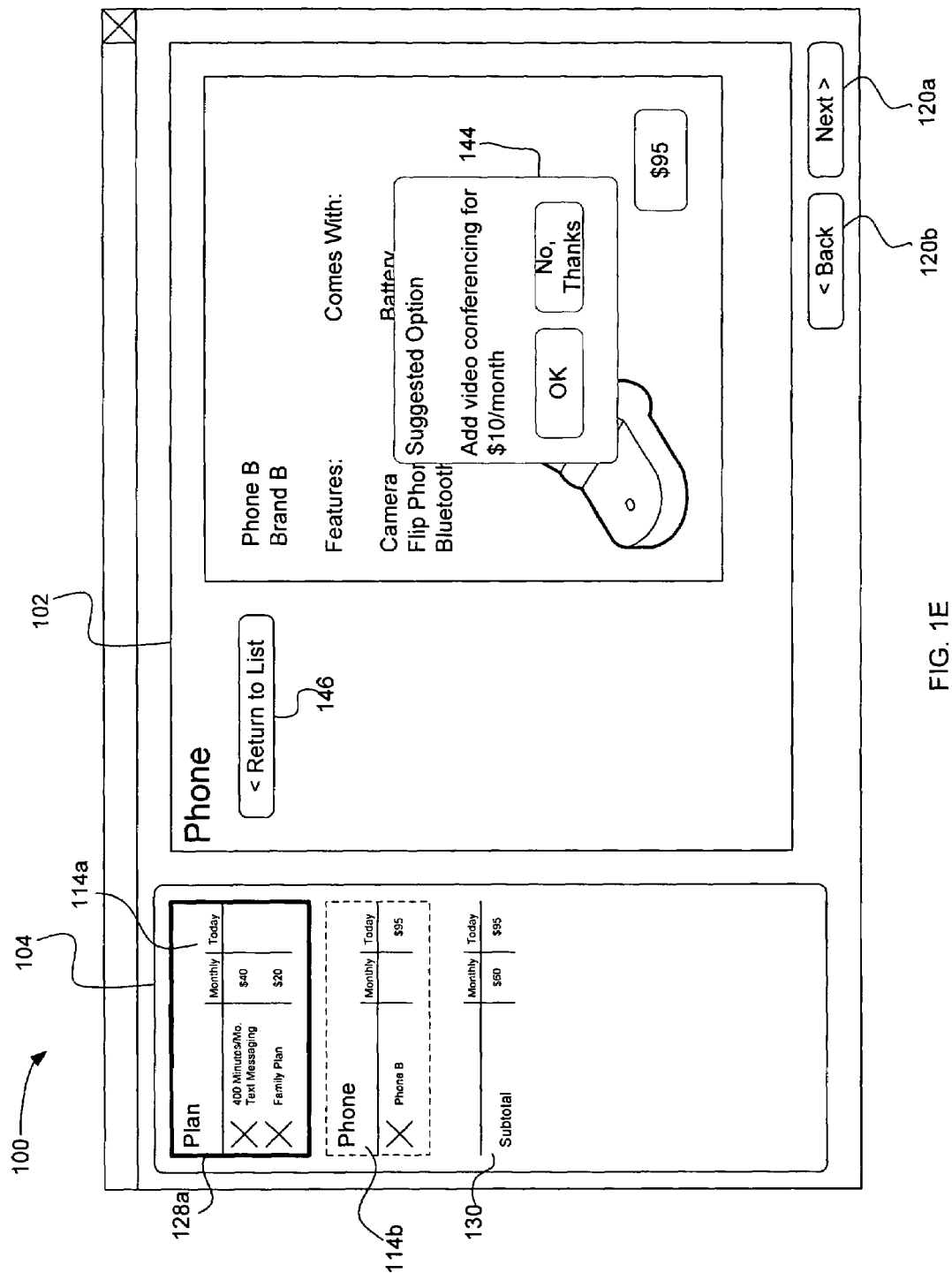

After the user selects a telephone using the button 140, the configurator 100 may prompt the user to add additional features. FIG. 1E illustrates a prompt after a user has selected a telephone according to some examples. After the user has selected his telephone by selecting the button 140, the receipt 114b updates to include the cost of the telephone in the 'today' column.

In some examples, a prompt window 144 allows a user to add a feature to his cellular service plan. For example, the user may be prompted to add video conferencing. If the user chooses to add the feature, the feature is added to the receipt 114a. In this way, the configurator 100 may be used to modify one operation while performing another operation. Once the user has chosen whether to add the feature, the user may select the next button 120a.

Figure 1F:
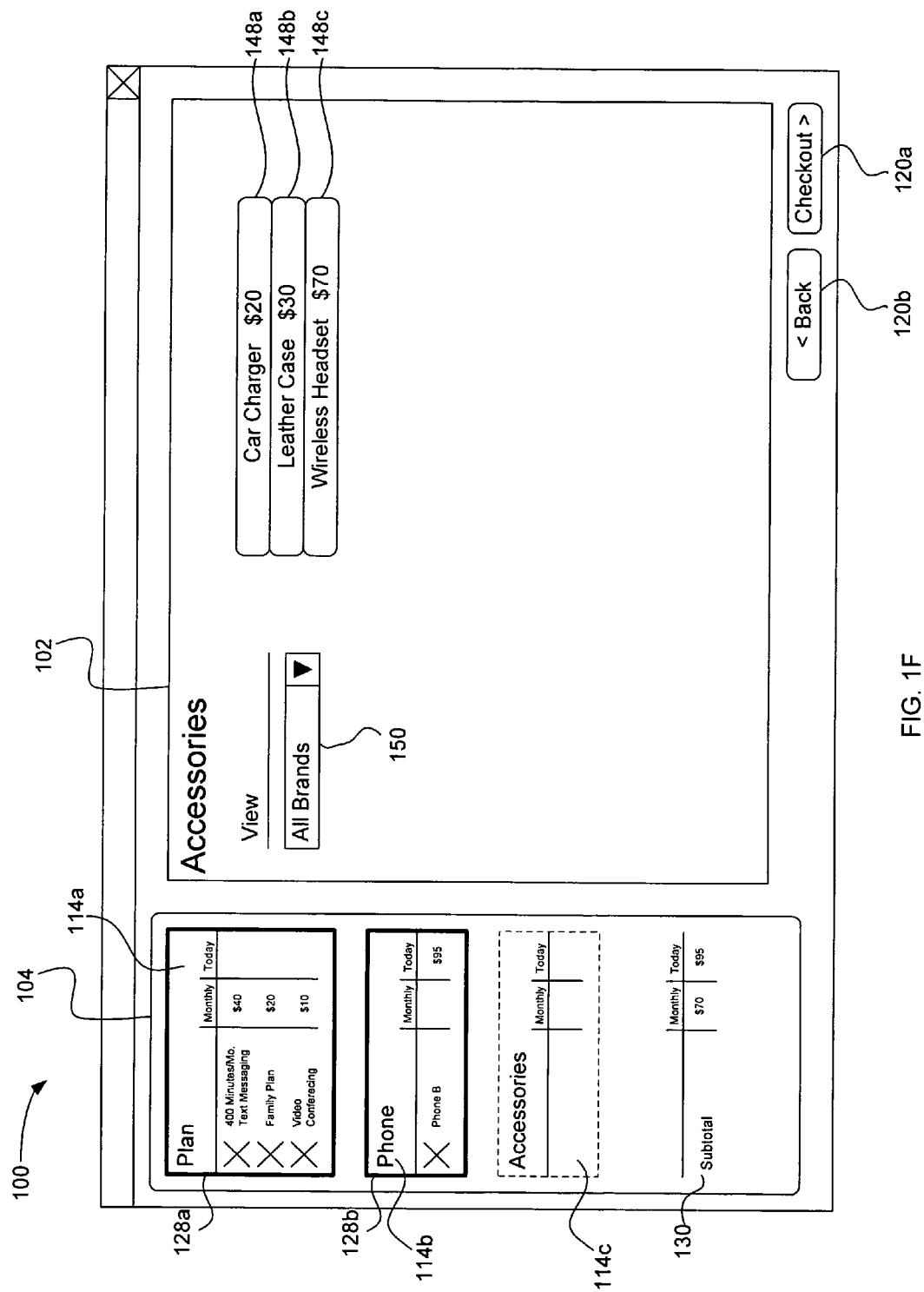

FIG. 1F illustrates an input pod and receipt pod for a third operation of the process according to some examples. The third operation allows a user to choose accessories for their cellular telephone. An input area 146 is displayed in the input pod 102. The input area includes several buttons 148. A pull-down menu 150 may allow a user to filter the buttons 148, for example, by brand.

For example, a user may select a car charger using the button 148a, and in response to the user's selection, an entry summarizing the result of the selection is displayed in a receipt 114c. A user may then select one of the other buttons 148 to add one of the other accessories to the purchase order. When the user selects one of the other buttons, a summarization of the result of the selection is added to the receipt 114c.

As with the receipt 114a, when the user proceeds to the third operation to select accessories, a border 128b may surround the receipt 114b to indicate that the receipt is for an operation that is not currently active. The user may select the receipt 114b (e.g., by clicking on it) to restore the input area for the second operation to the input pod 102. Likewise, the receipt 114c may include no border or a border distinct from the borders 128a and 128b to indicate that the receipt 114c corresponds to the currently active operation. Additionally, as discussed above, motion may be used to indicate the transition between the second and third operations.

The third operation is the final operation in the process shown here. The next button 120a may change its appearance to indicate that the next operation is a checkout operation. When a user selects the next button 120a, the user is prompted to enter shipping and payment information.

Figure 1G:
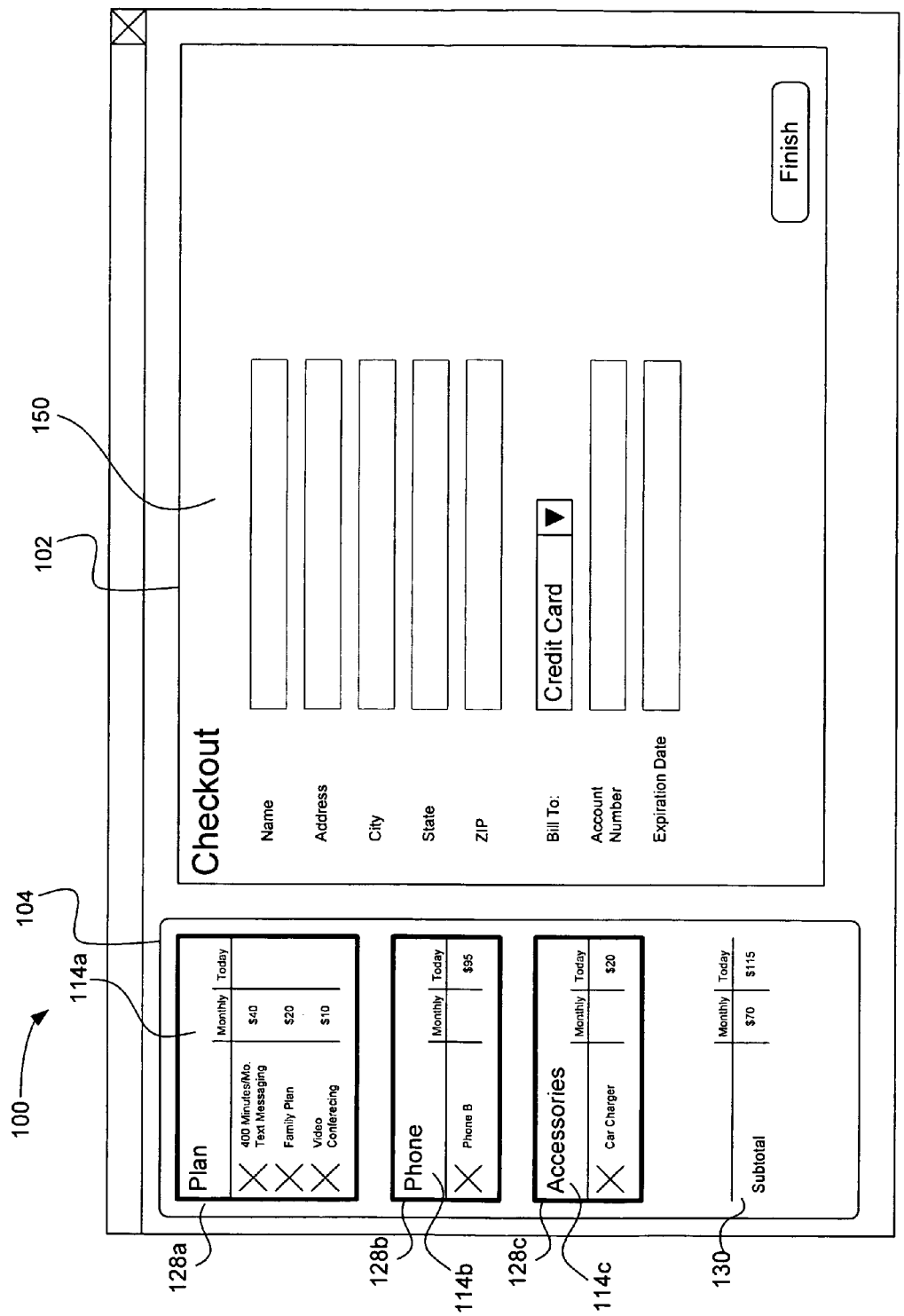

FIG. 1G illustrates a checkout operation in the input pod 102 according to some examples. Once the user has made his desired selections for the operations of the process, the user may proceed to a checkout operation shown in the input pod 102. The checkout operation may use another input area 152 corresponding to a fourth operation of the process.

The receipt pod 104 continues to show several summarized receipts 114 of the selections made during the various operations. Each of the receipts 114 includes a border 128, including a border 128c for the receipt 114c, since none of the operations corresponding to the receipts 114 is active. A user may select one of the receipts 114 to return to the operation summarized by the receipt.

Here, the input pod 102 includes an input area 152 for entering account and payment information. For example, a user may be prompted to enter his name, address, desired telephone number, or recurring payment information. Other information may be requested depending on the individual process represented using the configurator 100.

It is understood that various other processes comprising various other operations may be completed using the configurator 100. For example, a tax return process may include several operations. Each operation may be a different tax form (e.g., form 1040, 1098, or 1099), into which a user may input his return data. The form may then be summarized in the receipt pod 104. As another example, the configurator 100 may be used to create an account for an online or other type of service. The account process may include several operations, such as one prompting a user to enter personal information (e.g., name and home address) about himself, a second prompting the user to enter his preferred method of payment (e.g., bank draft or credit card), and a third prompting a user to enter his preferred method of delivery.

Additionally, various other checkout operations, or none at all, may be used with the configurator 100. For example, the checkout operations may include more than one operation, and may include areas to enter other information such as separate shipping and billing addresses, other contact information, or special instructions.

Pre-Selection Menus

Figure 2A:
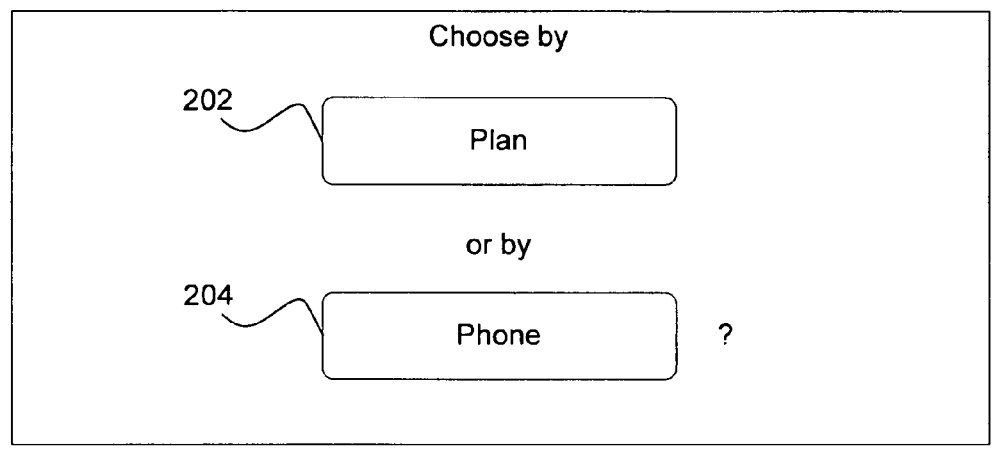
FIGS. 2A and 2B illustrate pre-selection menus for the configurator 100 according to an example.
Figure 2B:
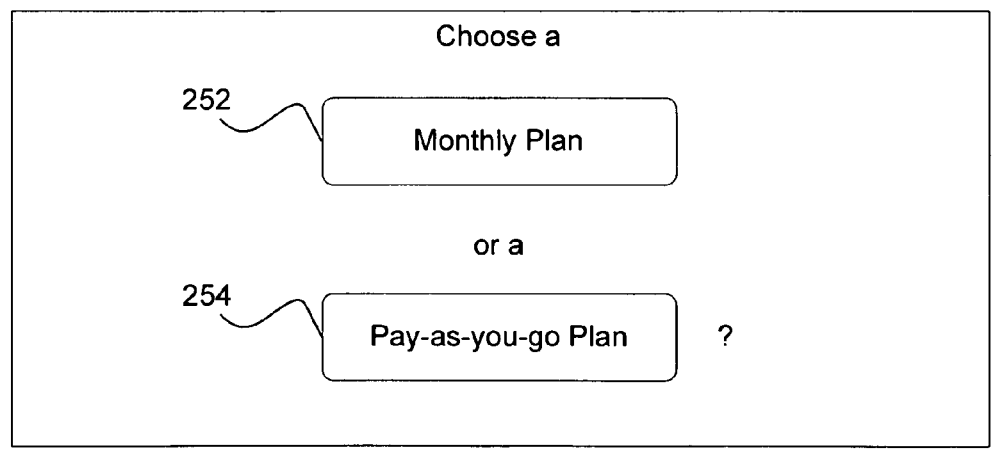

FIGS. 2A and 2B illustrate pre-selection menus for the configurator 100 according to some examples. Some aspects of the behavior of the configurator 100 may be determined using menus 200 and 250, which may be presented to the user before he begins using the configurator 100. One or more operations may be modified based on a user's input to the pre-selection menu. The menus 200 and 250 may be used to determine, for example, the order of the operations of the process or the content of the input areas shown above.

The menu 200 may allow a user to choose whether to organize the configurator 100 by plan or by phone. For example, certain cellular service plans may only be available with certain telephones. If the user selects the plan button 202, every plan in the configurator is presented to the user. The user selects a plan, and may then select a telephone that is compatible with the plan he has chosen. Likewise, if the user selects the phone button 204, the user may select a phone first, and then be presented with plans that may be combined with his selected telephone.

When using other types of configurators, menus such as the menu 200 may be used to allow a user to select which operations are used, what order they appear in, and their contents. For example, with an income tax form configurator, the menu 200 may be used to initially determine a type of return to file (e.g., form 1040 or 1040a), or additional forms (i.e., operations) a user may want.

The menu 250 allows a user to select the type of plan he would like prior to using the configurator 100. For example, the user may select the button 252 to be presented only with monthly plans, and the button 254 to be selected only with pay-as-you-go plans. Alternatively, all plans may be presented in the configurator 100. A menu 250 may be used in many situations, such as where a number of selections may be too great to comfortably display within a configurator, or where one type of selection is easily distinguishable from another.

Flowchart for Configuring a Multi-Operation Process

Figure 3:
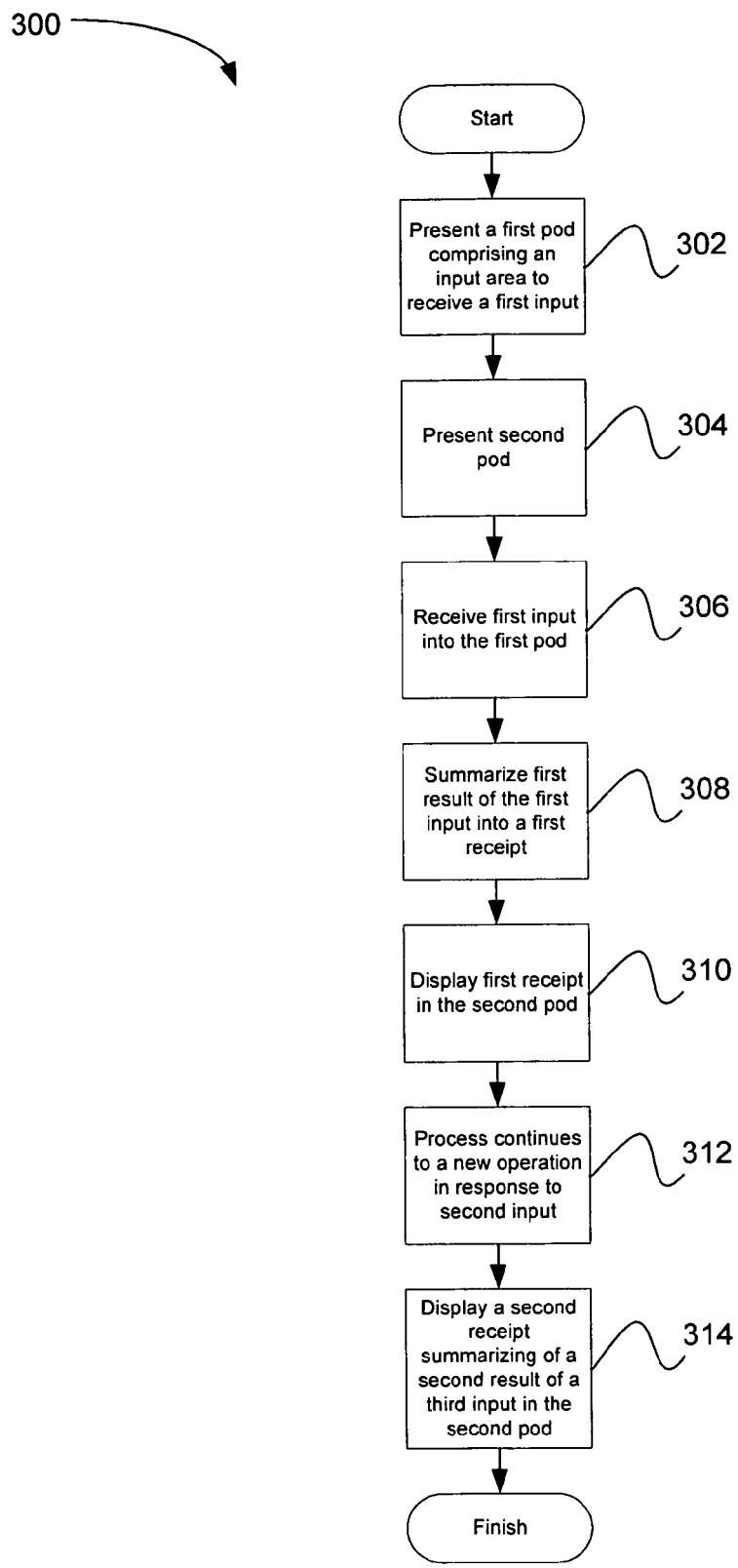
FIG. 3 is a flowchart describing using a configurator to collect a user's inputs and display receipts summarizing results of those inputs according to various examples.

FIG. 3 is a flowchart describing using a configurator to collect a user's inputs and display receipts summarizing results of those inputs according to some examples. In some examples, the flowchart 300 describes, in general, a process for using a configurator such as the configurator 100. The flowchart 300 may describe, for example, receiving input from a user and summarizing a result of the input into a receipt.

In block 302, a first pod having a first input area to receive a first input is presented. In block 304, a second pod is presented. The first pod may be, for example, the input pod 102 of FIGS. 1A-1G. The second pod may be, for example, the receipt pod 104. The first and the second pod may be presented by drawing or otherwise displaying a pod on a display of the user.

In block 306, the first input is received into the first pod. The first input may be received into one of the input areas of the configurator, depending on which operation is active. The first input may be, for example, a user clicking or otherwise selecting a button or other input device such as those shown in FIGS. 1A-1G. Additionally, the first input may include other data or information, such as user personal information or payment information.

In block 308, a first result of the first input is summarized into a first receipt. For example, a user may generate a first input selecting a cellular service plan. The first result of the first input is the plan that the user has selected. When the first result is summarized, for example, a first receipt such as the receipt 114*a* may be generated. The summary may include any amount of detail about the plan.

In block 310, the first receipt is displayed in the second pod. For example, the first receipt may be the receipt 114*a* displayed in the receipt pod 104. The first receipt may have no border to indicate that the operation to which the receipt corresponds is active.

In block 312, the process continues to a new operation. In some examples, the process may continue to a new operation using one of the navigation techniques described above and in FIG. 4. For example, a second input to activate a second operation may be received. A second input area may be displayed in the input pod 102, and the first input area may be visually transferred (e.g., using motion) into the first receipt. Additionally, when the process continues to the new operation, a visual indication may be added to the first receipt to identify the first receipt as corresponding to an operation that is no longer active.

In block 314, a second receipt including a summary of a second result of a third input may be displayed in the receipt pod. The second receipt may be, for example the receipt 114*b*. The second receipt may be generated in a manner similar to the generation of the first receipt. Additionally, a subtotal receipt that displays a total of the first receipt and the second receipt (such as the subtotal receipt 130) may also be displayed in the second pod.

Figure 4:
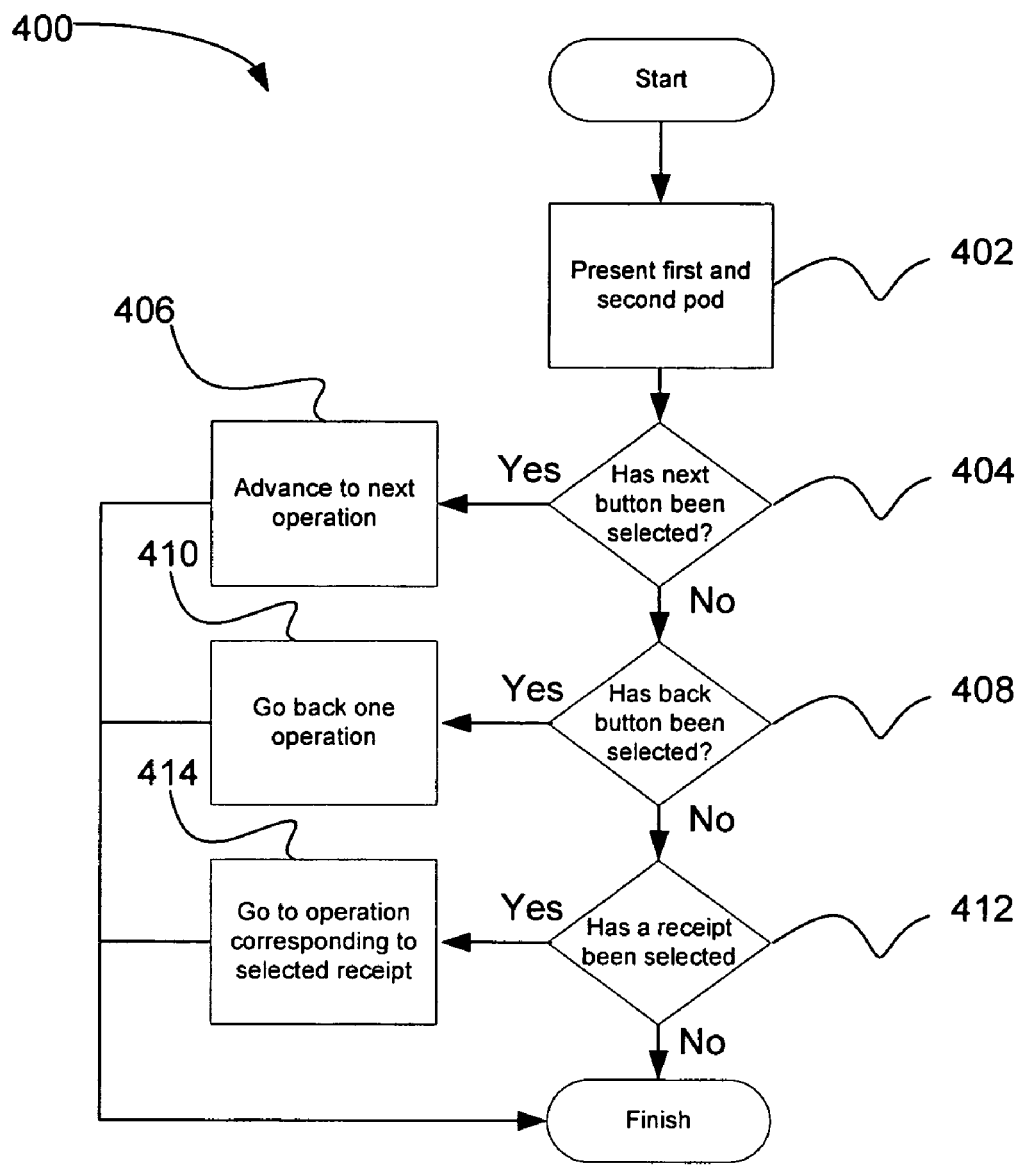
FIG. 4 is a flowchart describing navigation functions of a configurator according to various examples.

FIG. 4 is a flowchart describing navigation functions of a configurator according to some examples. In block 402, a first and second pod are presented. The first pod may be an input pod such as the input pod 102, and the second pod may be a receipt pod such as the receipt pod 104. The receipt pod 104 may include one or more receipts such as the receipts 114. The input pod 102 displays an input area relating to an operation currently being performed. For example, the configurator may currently be performing the second operation of the configurator 100 described above.

In block 404, it is determined whether the next button (e.g., the next button 120*a*) has been selected. If the next button 120*a* has been selected, in block 406, the configurator advances to the next operation (e.g., the third operation). If the next button 120*a* has not been selected, in block 408, it is determined whether the back button (E.g., the back button 120*b*) has been selected. If the back button 120*b* has been selected, in block 410 the configurator goes back one operation (e.g., to the first operation).

If the back button 120*b* has not been selected, in block 412, it is determined whether one of the receipts has been selected. If one of the receipts has been selected, in block 416, the configurator proceeds to the operation corresponding to the selected receipt.

An Exemplary Computer System

Figure 5:
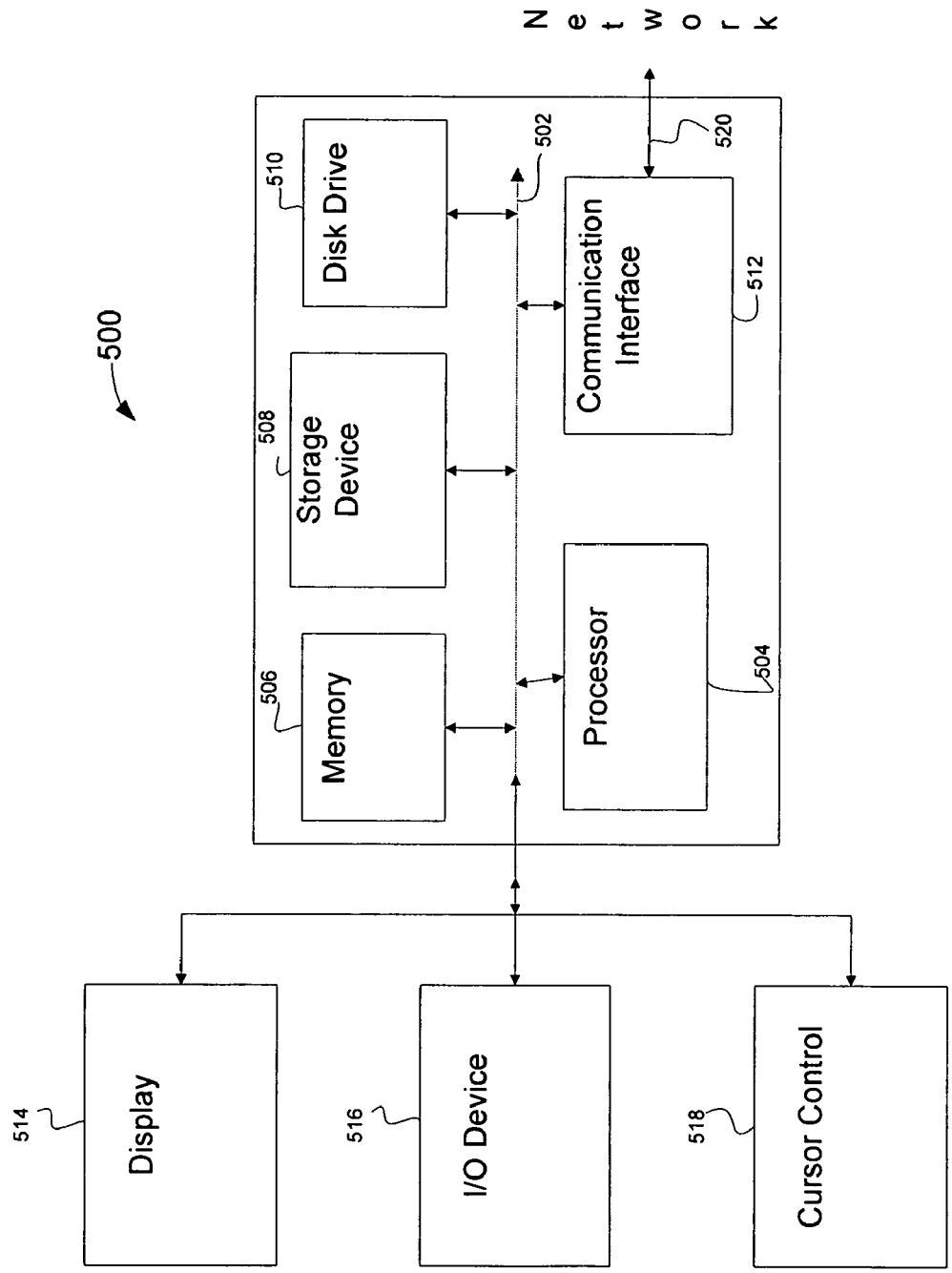
FIG. 5 is a block diagram illustrating an exemplary computer system suitable for implementing a configurator with receipts, in accordance with various examples of the invention.

FIG. 5 is a block diagram illustrating an exemplary computer system suitable for implementing a configurator with receipts, in accordance with some examples. In some examples, a computer system 500 may be used to implement computer programs, applications, methods, processes, or other software to perform the above-described techniques. The computer system 500 includes a bus 502 or other communication mechanism for communicating information, which interconnects subsystems and devices, such as a processor 504, a system memory 506 (e.g., RAM), a storage device 508 (e.g., ROM), a disk drive 510 (e.g., magnetic or optical), a communication interface 512 (e.g., modem or Ethernet card), a display 514 (e.g., CRT or LCD), an input device 516 (e.g., keyboard), and a cursor control 518 (e.g., mouse or trackball).

According to some examples, the computer system 500 performs specific operations by processor 504 executing one or more sequences of one or more instructions stored in the system memory 506. Such instructions may be read into the system memory 506 from another computer readable medium, such as the static storage device 508 or the disk drive 510. In some examples, hard-wired circuitry may be used in place of or in combination with software instructions.

Although the foregoing examples have been described in some detail for purposes of clarity of understanding, the above-described examples are not limited to the details provided. There are many alternative implementation techniques. The disclosed examples are illustrative and not restrictive.

What is claimed:

1. A method, comprising:
    displaying an input pod and a receipt pod simultaneously, wherein:
        the input pod is a visual container comprising one or more visible input areas; and
        the receipt pod is a visual container for displaying visible receipts, and the receipt pod is separate from the input pod;
    receiving a first input into a first input area of the input pod, wherein the first input area corresponds to a first operation;
    summarizing a result of the first input into a first receipt of the receipt pod, wherein the first receipt corresponds to the first operation;
    displaying the first receipt in the receipt pod; and repeating said receiving, said summarizing, and said displaying for one or more additional operations, wherein a different receipt is displayed in the receipt pod for each of the one or more additional operations.

2. The method of claim 1, wherein the receiving the first input comprises receiving the first input during a process comprising a plurality of operations, including the first operation.

3. The method of claim 2, further comprising:
receiving input to activate a second operation of the plurality of operations, and in response:
removing the first input area from the input pod;
drawing a second input area of the input pod, wherein the second input area is configured to receive input for the second operation; and
displaying the second input area simultaneously with the first receipt.

4. The method of claim 3, wherein the first receipt indicates that the first operation is inactive.

5. The method of claim 4, wherein the first receipt comprises a visual indication that the first operation is inactive.

6. The method of claim 3, further comprising receiving input to select the first receipt, and in response, restoring the first input area to the input pod.

7. The method of claim 3, further comprising:
receiving input into the second input area of the input pod;
summarizing a result of the input into the second input area of the input pod into a second receipt; and
displaying the second receipt in the receipt pod.

8. The method of claim 7, further comprising displaying in the receipt pod a subtotal receipt comprising a total of the first receipt and the second receipt.

9. The method of claim 3, further comprising receiving input to activate a checkout operation of the plurality of operations.

10. The method of claim 1, wherein the summarizing comprises visually transferring the first input area to the first receipt.

11. The method of claim 1, further comprising:
presenting a pre-selection menu before the displaying the input pod and the receipt pod simultaneously; and
modifying the first operation based on input to the pre-selection menu.

12. A method, comprising:
displaying an input pod and a receipt pod simultaneously, wherein:
the input pod is a visual container comprising one or more visible input areas; and
the receipt pod is a visual container for displaying visible receipts, and the receipt pod is separate from the input pod;
receiving a first input into a first input area of the input pod, wherein the first input area corresponds to a first operation;
summarizing a result of the first input into a first receipt of the receipt pod, wherein the first receipt corresponds to the first operation;
displaying the first receipt in the receipt pod; and
receiving input to activate a second operation that is different from the first operation, and in response, removing the first input area from the input pod and drawing a second input area of the input pod, wherein the second input area is configured to receive input for the second operation;
receiving a second input into the second input area of the input pod;
summarizing a result of the second input into a second receipt of the receipt pod, wherein the second receipt is different from the first receipt; and
displaying the first and second receipts in the receipt pod simultaneously.

13. The method of claim 12, further comprising displaying in the receipt pod a subtotal receipt comprising a total of the first receipt and the second receipt.

14. The method of claim 12, wherein the first operation and the second operation comprise a plurality of operations associated with a process.

15. The method of claim 12, further comprising:
presenting a pre-selection menu before the displaying the input pod and the receipt pod simultaneously; and
modifying the first operation based on input to the pre-selection menu.

16. The method of claim 12, wherein the first receipt indicates that the first operation is inactive in response to the receiving input to activate a second operation.

17. The method of claim 12, further comprising receiving input to select the first receipt, and removing the second input area and restoring the first input area in response to receiving the input to select the first receipt.

18. A system, comprising:
a memory configured to display an input pod and a receipt pod simultaneously, wherein:
the input pod is a visual container comprising one or more visible input areas; and
the receipt pod is a visual container for displaying visible receipts, and the receipt pod is separate from the input pod; and
a processor configured to perform:
receiving a first input into a first input area of the input pod, wherein the first input area corresponds to a first operation;
summarizing a result of the first input into a first receipt of the receipt pod, wherein the first receipt corresponds to the first operation;
displaying the first receipt in the receipt pod; and
repeating said receiving, said summarizing, and said displaying for one or more additional operations, wherein a different receipt is displayed in the receipt pod for each of the one or more additional operations.

19. The system of claim 18, wherein the receiving the first input comprises receiving the first input during a process comprising a plurality of operations, including the first operation.

20. The system of claim 19, the processor being further configured to:
receive input to activate a second operation of the plurality of operations, and in response, remove the first input area from the input pod and drawing a second input area of the input pod to receive input for the second operation.

21. The system of claim 20, the processor being further configured to:
receive input into the second input area of the input pod;
summarize a result of the input into the second input area of the input pod into a second receipt; and
display the second receipt in the receipt pod.

22. A computer program product embodied in a computer readable medium and comprising computer instructions for:
displaying an input pod and a receipt pod simultaneously, wherein:
the input pod is a visual container comprising one or more visible input areas; and the receipt pod is a visual container for displaying visible receipts, and the receipt pod is separate from the input pod;

receiving a first input into a first input area of the input pod, wherein the first input area corresponds to a first operation;

summarizing a result of the first input into a first receipt of the receipt pod, wherein the first receipt corresponds to the first operation;

displaying the first receipt in the receipt pod; and repeating said receiving, said summarizing, and said displaying for one or more additional operations, wherein a different receipt is displayed in the receipt pod for each of the one or more additional operations.

23. The computer program product of claim 22, wherein the receiving the first input comprises receiving the first input during a process comprising a plurality of operations, including the first operation.

24. The computer program product of claim 23, the computer instructions further comprising:

receiving input to activate a second operation of the plurality of operations, and in response:
removing the first input area from the input pod;
drawing a second input area of the input pod, wherein the second input area is configured to receive input for the second operation; and
displaying the second input area simultaneously with the first receipt.

25. The computer program product of claim 24, the computer instructions further comprising:

receiving input into the second input area of the input pod;
summarizing a result of the input into the second input area of the input pod into a second receipt; and
displaying the second receipt in the receipt pod.

\* \* \* \* \*